March 14, 1961 C. E. MERRITT 2,974,974
ASSEMBLY FOR STEERING TWO OR FOUR WHEELS
Filed March 6, 1959 3 Sheets-Sheet 1

INVENTOR.
Clarence E. Merritt.
BY
Harness, Dickey & Pierce.
ATTORNEYS.

March 14, 1961 C. E. MERRITT 2,974,974
ASSEMBLY FOR STEERING TWO OR FOUR WHEELS
Filed March 6, 1959 3 Sheets-Sheet 2
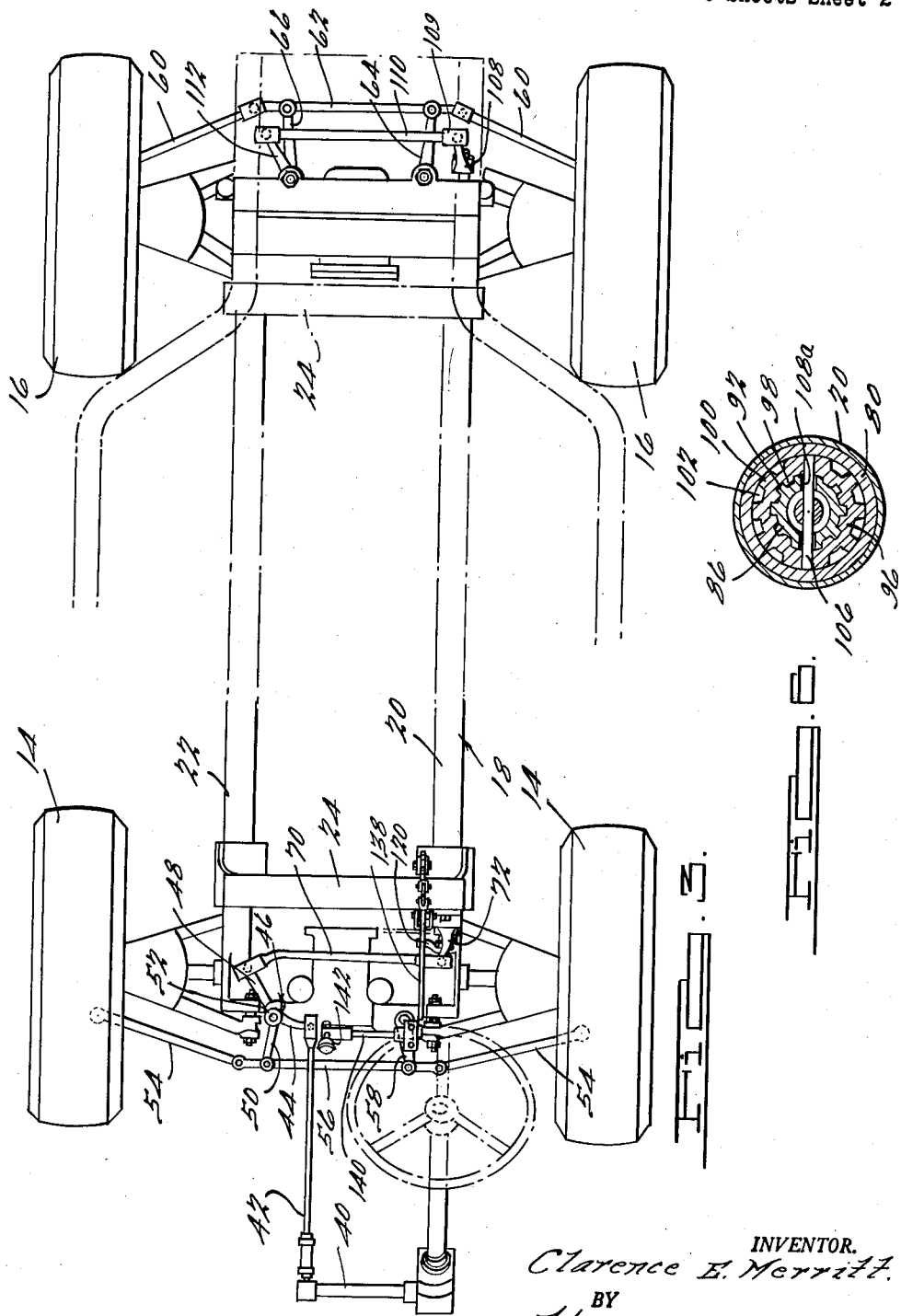
INVENTOR.
Clarence E. Merritt.
BY
Harness, Dickey & Pierce
ATTORNEYS.

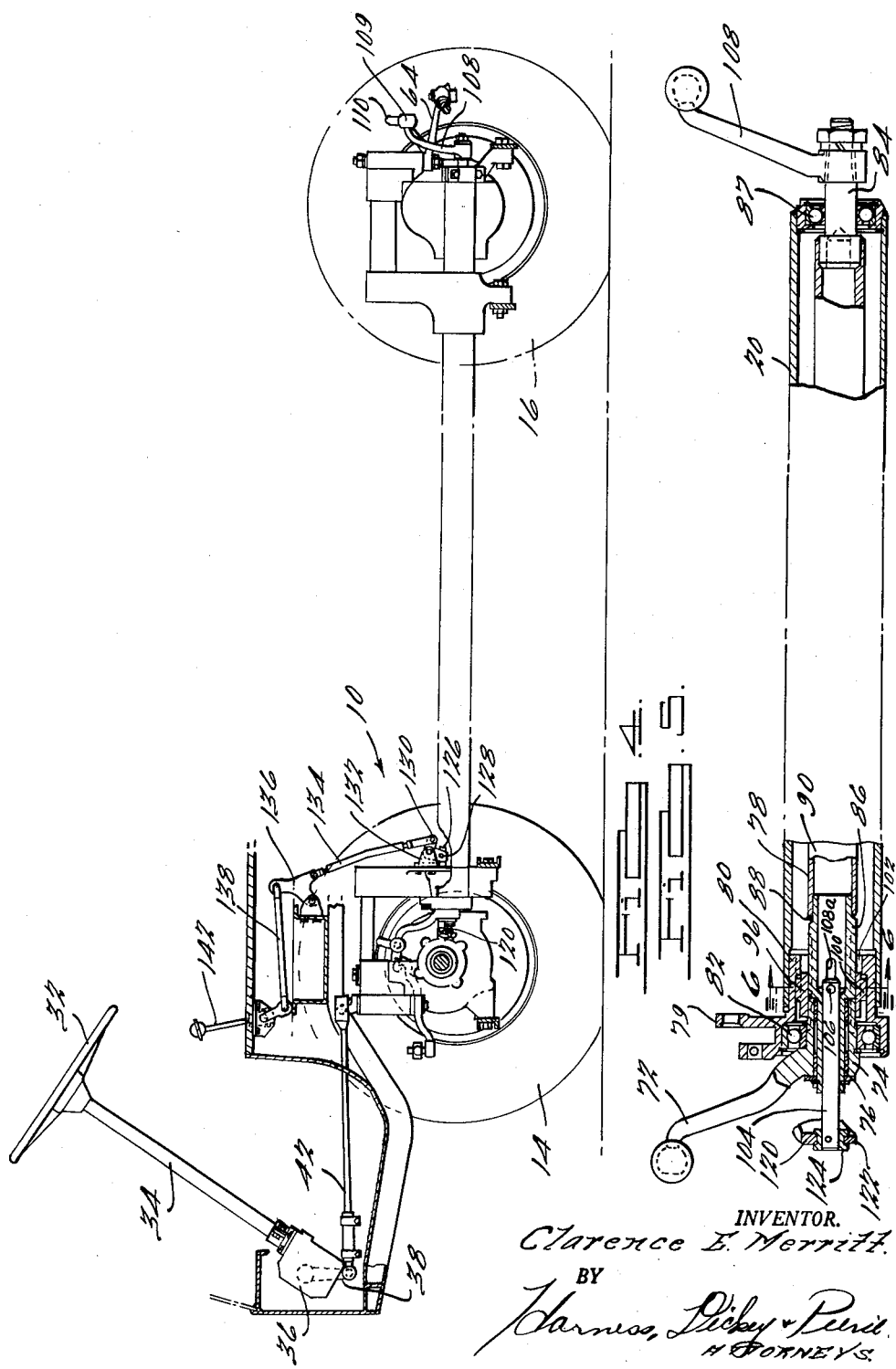

United States Patent Office 2,974,974
Patented Mar. 14, 1961

2,974,974

ASSEMBLY FOR STEERING TWO OR FOUR WHEELS

Clarence E. Merritt, Toledo, Ohio, assignor, by mesne assignments, to Bank of America National Trust and Savings Association Filed Mar. 6, 1959, Ser. No. 797,606

4 Claims. (Cl. 280—91)

This invention relates generally to steering assemblies for automotive vehicles and more particularly to a steering assembly which is capable of providing four-wheel steering.

In certain vehicles a four-wheel steering is oftentimes desired. It is an object of this invention, therefore, to provide an improved steering assembly for vehicles of this type which is readily operable to provide for either two or four-wheel steering, as desired, by means of a shift lever disposed adjacent the vehicle driver, and structure which is responsive in operation to actuation of the shift lever and is disposed beneath the vehicle platform in a position in which it does not interfere with the other vehicle structure disposed below the platform and does not project below or to one side of the vehicle silhouette.

A further object of this invention is to provide a vehicle steering assembly which is simple in construction, economical to manufacture, and easily operated to provide for either two or four-wheel steering as desired.

Further objects, features and advantages of this invention will become apparent from a consideration of the following description, the appended claims and the accompanying drawing in which:

Figure 3 is a plan view of the chassis in the vehicle of Fig. 1;

Figure 4 is a side view of the chassis shown in Fig. 3;

Figure 5 is a detail view of the transfer rod and frame tube assembly in the steering assembly of this invention; and Figure 6 is a transverse sectional view looking along the line 6—6 in Fig. 5.

Figure 1:
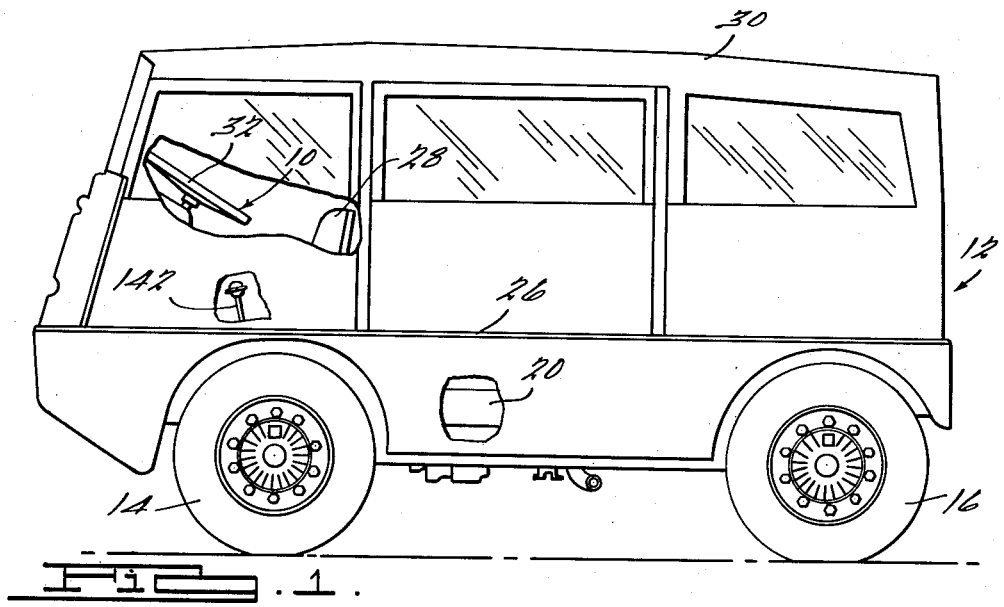
Figure 1 is a side elevational view of a vehicle provided with the steering assembly of this inention, with some parts broken away and other parts shown in section for the purpose of clarity.
Figure 2:
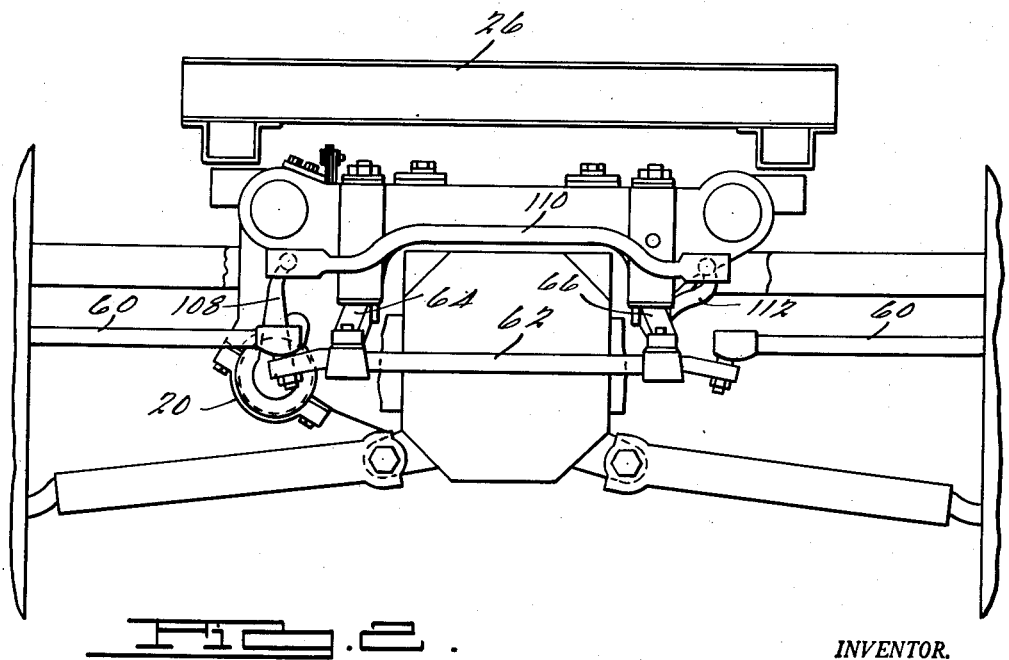
Figure 2 is a fragmentary rear view of a portion of the vehicle shown in Fig. 1.

With reference to the drawing, the steering assembly of this invention, indicated generally at 10, is illustrated in Fig. 1 in assembly relation with a vehicle 12 having front wheels 14 and rear wheels 16. The vehicle 12 has a main frame 18 which includes a pair of tubular frame members 20 and 22 which extend longitudinally of the vehicle along transversely opposite sides thereof and are connected by cross frame members 24. A load supporting platform 26 is mounted on the main frame 18 and extends fore and aft of the vehicle beyond the front and rear wheels 14 and 16. A driver's seat 28 is supported on the platform 26 at a position above the front wheels 14 and one or more other seats may be supported on the platform 26, if desired. In the illustrated form of the vehicle 12, it is provided with a body 30 which is of a size to enclose the driver's seat 28 along with the remainder of the platform 26 disposed rearwardly of the seat 28. It is to be understood, of course, that the body 30 may be omitted or may consist of only a cab for the driver's seat 28.

Each of the wheels 14 and 16 is mounted for horizontal swinging movement about a supporting pin assembly (not shown) to provide for steering of the vehicle 12. A conventional steering wheel 32 is positioned forwardly of the operator's seat 28 and is mounted on an upwardly and rearwardly inclined steering column 34 secured at its lower end to a gear housing 36. On turning movement of the steering wheel 32, a rocker arm 38 which is mounted on a shaft 40 supported at one end on the housing 36 is swingable fore and aft of the vehicle 12 to either push or pull an actuating rod 42 in a direction fore and aft of the vehicle. At its rear end, the rod 42 is connected to one arm 44 of a three-arm unit 46 which includes two arms 48 and 50 in addition to the arm 44. The arms 44, 48 and 50 are formed integral with a central hub 52 which is rotatably supported on the main frame 18 for swinging movement about a vertical axis.

The front wheels 14 are steered by means of connecting tie rods 54 which extend inwardly of the vehicle and are pivotally connected at their inner ends to opposite ends of a connecting rod 56. The arm 50 is pivotally connected to the rod 56 adjacent one end thereof and a similar forwardly extending arm 58, which is pivotally supported on the main frame 18, is connected to the connecting rod 36 adjacent its opposite end. As a result, when the connecting rod 56 is reciprocated in a direction transversely of the vehicle, the tie rods 54 are actuated to steer the wheels 14.

The rear wheels 16 are steered by means of similar inwardly extending tie rods 60 which are pivotally connected at their inner ends to opposite ends of a connecting rod 62. Adjacent its ends, connecting rod 62 is pivotally connected to the rear ends of a pair of horizontally spaced support arms 64 and 66 which are pivotally mounted at their inner ends on the main frame 18. Consequently, in response to reciprocal movement of the connecting rod 62 in a direction transversely of the vehicle 12, the tie rods 60 are manipulated to swing the rear wheels 16 about their pin supports.

When the front connecting rod 56 is reciprocated to steer the front wheels 14, the hub 52 is rotated to in turn swing the arm 48 in a horizontal plane. A link 70, pivotally connected at one of its ends to the arm 48, is connected at its opposite end by a ball and socket type joint to an arm 72 (Figs. 3 and 5) which has a hub 74 rotatably mounted on the reduced end portion 76 of a transfer shaft 78 which is disposed within and projects outwardly from opposite ends of the frame tube 20. As shown in Fig. 5, the transfer shaft 78 consists of a main tube section 90, which is disposed within and extends nearly the full length of the frame tube 20, an end section 86, which is secured by welding to the section 90 and is of an outer diameter corresponding to the diameter of the hub 74 and has the reduced portion 76 extended out of the forward end of the tube 20, and an end section 84 which is secured to the section 90 and extends out of the rear end of the tube 20 and is supported in a bearing 87. A support bracket 79 has a sleeve portion 80, which is mounted in a fixed position in the front end of the tube 20 and carries a ball bearing unit 82 which rotatably supports the hub 74 which in turn rotatably supports the reduced end portion 76 of the transfer shaft 78.

The external surface of the tubular section 86 and the coaxial hub 74 are formed with spline teeth 92, and a shift collar 96 has teeth 98 on its inner surface of a size to mesh with the teeth 92 and is slidably supported on the tubular section 86 and the hub 74. The shift collar 96 has external teeth 100 which interfit with teeth 102 formed on the sleeve 80.

A shift rail 104, which is slidably supported in the reduced shaft end portion 76, carries a transversely extending pin 106 which extends through slots 108a in the tubular end section 86 and is connected at its ends to the shift collar 96. In the illustrated position of the shift rail 104 (Fig. 5) in which the pin 106 is at the forward ends of the slots 108, the teeth 100 are displaced longitudinally from the teeth 102 and the shift collar 96 overlaps the adjacent ends of the tubular section 86 and the hub 74 so that the internal collar teeth 98 mesh with the teeth 92 on the tubular section 86 and the hub 74. As a result, the hub 74 is releasably locked to the transfer shaft 78 so that rotation of the arm 72 is effective to produce rotation of an arm 108 which is secured to the rear end section 84 of the shaft 78. The arm 108 is connected by a ball and socket type joint 109 to one end of a link 110 (Fig. 3) which is connected by another ball and socket type joint 111 at its opposite end to an arm 112 formed integral with the arm 66 which actuates the rear connecting rod 62.

As a result, movement of the front connecting rod 56 which is effective to produce turning of the front wheels 14 also provides for a corresponding movement of the rear connecting rod 62 effective to also turn the rear wheels 16 through the same angle that the front wheels have been turned. The movement of the rear connecting rod 62 is equal to the movement of the front connecting rod 56 by virtue of the fact that the arms 72 and 108 are of equal lengths so that the arc proscribed by the outer end of the arm 72 is transmitted to the outer end of the arm 108.

When the shift rail 104 is moved to an inner position, corresponding to a position of the pin 106 at the rear ends of the slots 108a, the collar 96 is moved off the hub 74 so that the internal teeth 98 on the collar 96 are moved out of engagement with the teeth 92 on the hub 74 and the external teeth 100 on the collar 96 are moved into meshing engagement with the teeth 102 on the sleeve 80. In this position of the shift collar 96, therefore, the transfer shaft 78 is locked, by means of the shift collar 96, to the frame tube 20 to thereby prevent swinging of the rear arm 108 with the consequent steering of the rear wheels 16. The rear wheels 16 are thus held in fixed rotatable positions. The hub 74 for the arm 72 is freely rotatable in the bearing unit 82 with respect to the reduced transfer shaft end portion 76 but this movement of the arm 72 in response to steering movement of the actuating rod 70 is ineffective to accomplish any movement of the rear wheels 16.

The shift rail 104 is movable fore and aft of the vehicle 12 by means of a bar 120 which has a bifurcated end portion 122 supported on a shift spool 124 secured to the forward end of the shift rail 104. The opposite end of the bar 120 is connected to the forward end of an actuating rod 126 which carries a transversely extending pin 128 at its rear end. A bellcrank member 130 is pivotally supported intermediate its ends on a bracket 132 carried by the main frame 18 so that the bellcrank 130 is swingable about a horizontal axis. One end of the bellcrank 130 is bifurcated and receives the pin 128. The opposite end of the bellcrank 130 is pivotally connected to the lower end of a link member 134, the upper end of which is connected to a bellcrank 136.

An actuating rod 138 is connected to and extends forwardly from the bellcrank 136 which is pivotally mounted on the frame for swinging movement about a horizontal axis. The forward end of the rod 138 is connected to a shaft 140 which carries an upwardly extending shift lever 142 disposed adjacent the driver's seat 28 for convenient operation by the vehicle driver.

When the upper end of the shift lever 142 is moved forwardly of the vehicle 12, the shift collar 96 is moved forwardly on the transfer shaft 78 to lock the shaft to the hub 74 on the steering arm 72 to thereby provide for four-wheel steering of the vehicle 12. In order to provide for two-wheel steering of the vehicle 12, the upper end of the shift lever 142 is moved rearwardly by the vehicle operator so that the shift rail 104 is likewise moved rearwardly to move the shift collar 96 to a position in which it locks the transfer shaft 78 to the frame tube 20.

From the above description, it is seen that this invention provides for both two and four-wheel steering of the vehicle 12, with the position of the shift lever 142 determining which type of steering is being used at any one time. By virtue of the location of the shift lever 142 adjacent the vehicle driver, the type of steering is readily changed as desired. By utilizing the frame tube 20 as a housing for the transfer shaft 78, the space within the frame tube 20 which is normally wasted, is utilized for the steering assembly 10 which thus does not interfere with the arrangement of the other vehicle parts underneath the platform 26 and is protected by the tube 20 against damage.

Although the invention has been described with respect to a preferred embodiment thereof, it is to be understood that it is not to be so limited, since changes can be made therein which are within the scope of the invention as defined by the appended claims.

What is claimed is:

1. In a vehicle having front and rear wheels mounted for steering movement, a manually operable steering member, means including a plurality of link members connected to said steering member and said front wheels for turning said front wheels in response to operation of said steering member, a link mechanism operatively associated with said rear wheels and actuatable to provide steering movement thereof, and a main frame which includes a tubular member that extends fore and aft of the vehicle between the front and rear wheels; a transfer member rotatably supported in said frame tube, an actuator member adjacent said transfer member and connected to said link members for actuating movement in response to steering movement of said link members, means releasably connecting the front end of said transfer member to said actuator member for rotatable movement in response to operation of said steering member, means connecting the rear end of said transfer member to said link mechanism to provide for steering movement of said rear wheels in response to rotation of said transfer member, said releasable connecting means comprising a member shiftable between two positions, said shiftable member in one position operating to connect said transfer member to said actuator member so that steering movement of said front wheels causes concurrent steering movement of said rear wheels and in a second position operating to connect said transfer member to said frame tube so that said rear wheels are maintained in fixed positions, and means operable from a location adjacent said steering member for moving said shiftable means out of a connecting relation with said link members and said transfer member so that only said front wheels are steerable by said steering member.

2. In a vehicle having front and rear wheels mounted for steering movement, a manually operable steering member, means including a plurality of link members connected to said steering member and said front wheels for turning said front wheels in response to operation of said steering member, a link mechanism operatively associated with said rear wheels and actuatable to provide for steering movement thereof, and a main frame which includes a tubular member that extends fore and aft of the vehicle between the front and rear wheels thereof; a transfer shaft rotatably supported in said frame tube, an actuator arm rotatably supported on the front end of said shaft, a shift collar slidably supported on said transfer shaft for movement between a first position in interlocking engagement with both said arm and said shaft for transmitting rotation of said arm to said shaft and a second position on said shaft in interlocking engagement with the shaft and said frame tube and out of interlocking engagement with said arm, whereby to fix the position of said rear wheels, and means connecting the actuator arm to said link members for rotatable movement of the arm in response to operation of said steering member and means connecting the rear end of said transfer shaft and said link mechanism for actuating said link mechanism to provide for steering movement of said rear wheels in response to rotation of said transfer shaft.

3. In a vehicle having front and rear wheels mounted for steering movement, a manually operable steering member, means including a plurality of link members connected to said steering member and said front wheels for turning said front wheels in response to operation of said steering member, a link mechanism operatively associated with said rear wheels and actuatable to provide for steering movement thereof, and a main frame which includese a tubular member that extends fore and aft of the vehicle between the front and rear wheels thereof; a transfer shaft rotatably supported in said frame tube, an actuator arm rotatably supporteed on the front end of said shaft, a shift collar slidably supported on said transfer shaft for movement between a first position in interlocking engagement with both said arm and said shaft and a second position on said shaft in interlocking engagement with the shaft and said frame tube and out of interlocking engagement with said arm, the positions of said rear wheels being fixed by said shift collar in said second position thereof, coacting teeth on said collar and said shaft and arm releasably locking said shaft and arm together for concurrent rotation in said first position of said shift collar, and means connecting the actuator arm to said link members for rotatable movement of the arm in response to operation of said steering member and means connecting the rear end of said transfer shaft and said link mechanism for actuating said link mechanism to provide for steering movement of said rear wheels in response to rotation of said transfer shaft.

4. In a vehicle having front and rear wheels mounted for steering movement, a manually operable steering member, means including a plurality of link members connected to said steering member and said front wheels for turning said front wheels in response to operation of said steering member, a link mechanism operatively associated with said rear wheels and actuatable to provide for steering movement thereof, and a main frame which includes a tubular member that extends fore and aft of the vehicle between the front and rear wheels thereof; a transfer shaft rotatably supported in said frame tube, an actuator arm rotatably supported on the front end of said shaft, a shift collar slidably supported on said transfer shaft for movement between a first position in interlocking engagement with both said arm and said shaft for transmitting rotation of said arm to said shaft and a second position on said shaft out of interlocking engagement with said arm, coacting teeth on said collar and said shaft and arm releasably locking said shaft and arm together for concurrent rotation in said first position of said shift collar, interengageable teeth on said shift collar and said frame tube locking said shift collar to said frame tube in said second position, and means connecting the actuator arm to said link members for rotatable movement of the arm in response to operation of said steering member and means connecting the rear end of said transfer shaft and said link mechanism for actuating said link mechanism to provide for steering movement of said rear wheels in response to rotation of said transfer shaft.

References Cited in the file of this patent

UNITED STATES PATENTS

| | | |
|---|---|---|
| 1,090,447 | Buckwalter | Mar. 17, 1914 |
| 1,713,084 | Klinkman | May 14, 1929 |
| 2,339,205 | Tapp | Jan. 11, 1944 |
| 2,354,830 | Reid | Aug. 1, 1944 |
| 2,389,752 | Avery | Nov. 27, 1945 |
| 2,796,140 | Knolle | June 18, 1957 |